April 28, 1959 W. C. H. CROOK ET AL 2,883,905
OPTICAL CONTOUR GAUGING APPARATUS
Filed May 15, 1957 2 Sheets-Sheet 1

INVENTORS
WILLIAM C. H. CROOK
ROBERT V. WILLSHER
BY Watson, Cole, Grindle & Watson
ATTORNEYS April 28, 1959 W. C. H. CROOK ET AL 2,883,905
OPTICAL CONTOUR GAUGING APPARATUS
Filed May 15, 1957 2 Sheets-Sheet 2
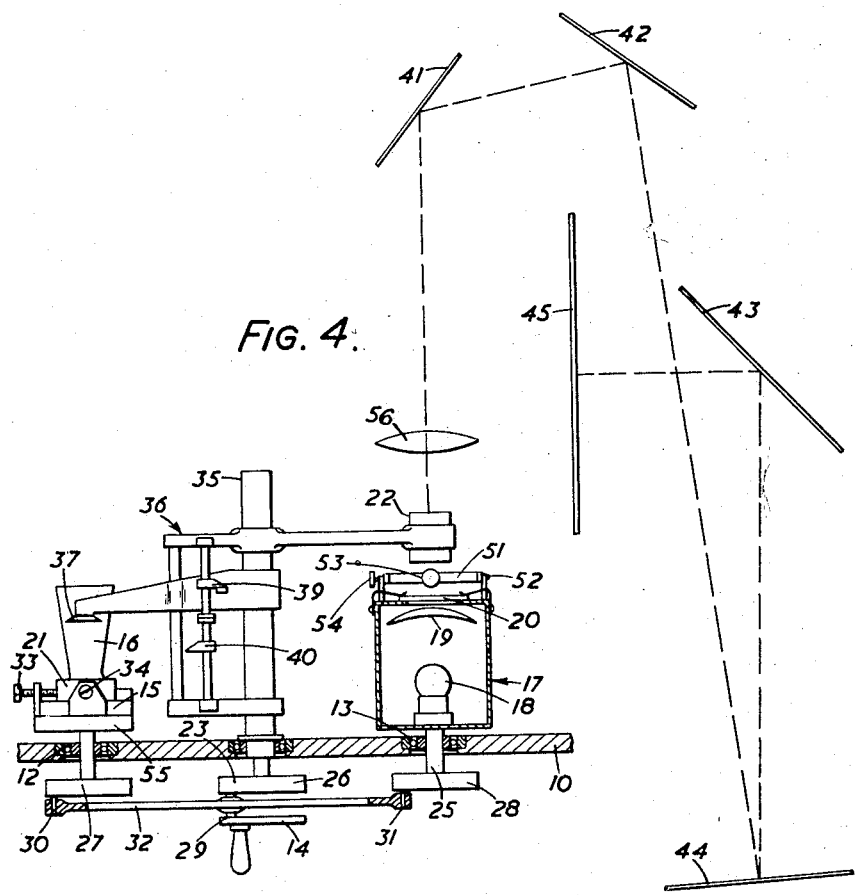
INVENTORS
WILLIAM C. H. CROOK
ROBERT V. WILLSHER
BY Watson, Cole, Grindle & Watson
ATTORNEYS United States Patent Office 2,883,905
Patented Apr. 28, 1959

2,883,905

OPTICAL CONTOUR GAUGING APPARATUS

William C. H. Crook, Hounslow, and Robert V. Willsher, Norwood Green, Southall, England, assignors to D. Napier & Son Limited, Acton Vale, London, England, a company of Great Britain Application May 15, 1957, Serial No. 659,369

Claims priority, application Great Britain May 16, 1956

7 Claims. (Cl. 88—24)

This invention relates to optical contour gauging apparatus of the kind in which the accuracy of a contour is ascertained by comparison on a screen of a magnified image of a contour graticule (i.e. a picture of the contour on a slide or the like) with a form, enlarged to the same scale, representing a follower which traces over an actual contour. The contour graticule may be a master actual contour and the actual contour that of the article being gauged, or the actual contour may be a master and the contour graticule derived from the article being gauged. The former is generally the more practically useful system but the invention is applicable to either.

One type of apparatus of this kind, and which is herein referred to as apparatus of the type specified, comprises a light source and a condenser lens system producing a substantially parallel light beam, a projector lens system movable transversely with respect to the light beam, a movably mounted follower adapted to trace over an actual contour and connected to the projector lens system so that the projector lens system exactly follows the movements of the follower in directions transverse to the light beam, a contour graticule disposed approximately in the object focal plane of the projector lens system but held against transverse movements relatively to the light beam, a screen upon which a magnified image of the contour graticule is thrown by the projector lens system, and a magnified image on the screen representing at least that part of the follower which makes contact with the actual contour.

The image representing the follower remains stationary on the screen, or practically so, depending on the construction of the apparatus, while the image of the contour graticule moves in response to movements of the projector lens system. The area of the screen occupied by the point of contact between the images during a gauging operation will in general be substantially smaller than is the case in certain forms of optical gauging apparatus of other types, where the contour graticule image remains stationary and the follower image moves, which makes apparatus of the type specified easier and less tiring to use. Indeed, with certain contours without re-entrants, or with a pointed follower, the point of contact between the images will remain motionless on the screen.

In apparatus of the type specified as hitherto proposed the projector lens system and the follower have been mounted on a movable member which is guided so that it can be moved rectilinearly in two directions at right angles in a plane transverse to the light beam, the follower being mounted on an arm projecting laterally from this member. This arrangement has the disadvantage that owing to the presence of the arm the follower cannot trace right round any given contour of a three-dimensional body, and also the accuracy may be reduced when the side of the follower is engaging the contour. To overcome the former difficulty it has been proposed to employ two separate followers and two separate projector lens systems, but this involves complications and increases the risks of inaccuracy. It is an object of the invention to provide certain improvements obviating these disadvantages and providing additional advantages.

According to the invention, apparatus of the type specified includes a mounting for the article to be gauged rotatable about an axis normal to the plane of movement of the follower, a mounting for the contour graticule rotatable about an axis normal to the plane of movement of the projector lens system, and connecting means between these mountings whereby they are constrained to rotate simultaneously and through equal angles.

Thus, as the article is rotated, the image of the contour graticule on the screen is rotated correspondingly. This enables the contour of the complete profile of the article in any given transverse plane thereof to be gauged.

Preferably the follower and the projector lens system are mounted on a common structure at equal radii from an axis about which the structure is pivoted and which is parallel with the optical axis of the projector lens system and perpendicular to the plane of the contour being gauged.

Conveniently, the light source, the condenser lens system and the contour graticule are mounted on a common rotatable structure, which ensures that when once adjusted the contour graticule will remain stationary relatively to the light beam from the condenser lens system. It also enables rotation to be imparted to the contour graticule in a simple manner.

In order that the contour of an article in several different transverse planes thereof can be gauged simultaneously, the contour graticule may comprise distinguishable pictures of the contours at these different planes (e.g. in distinguishable lines such as plain lines and various forms of dotted or other interrupted lines) and the follower may be mounted so that it can be set in any of these planes.

The invention may be performed in various ways, and two different forms of optical contour gauging apparatus embodying the invention, for gauging turbine or compressor blades, will now be described by way of example with reference to the accompanying drawings, in which:

Figure 3 is a representation of the images on the screen; and

Figure 4 is a schematic diagram, corresponding to Figure 1, of another form of the apparatus.

Figure 1:
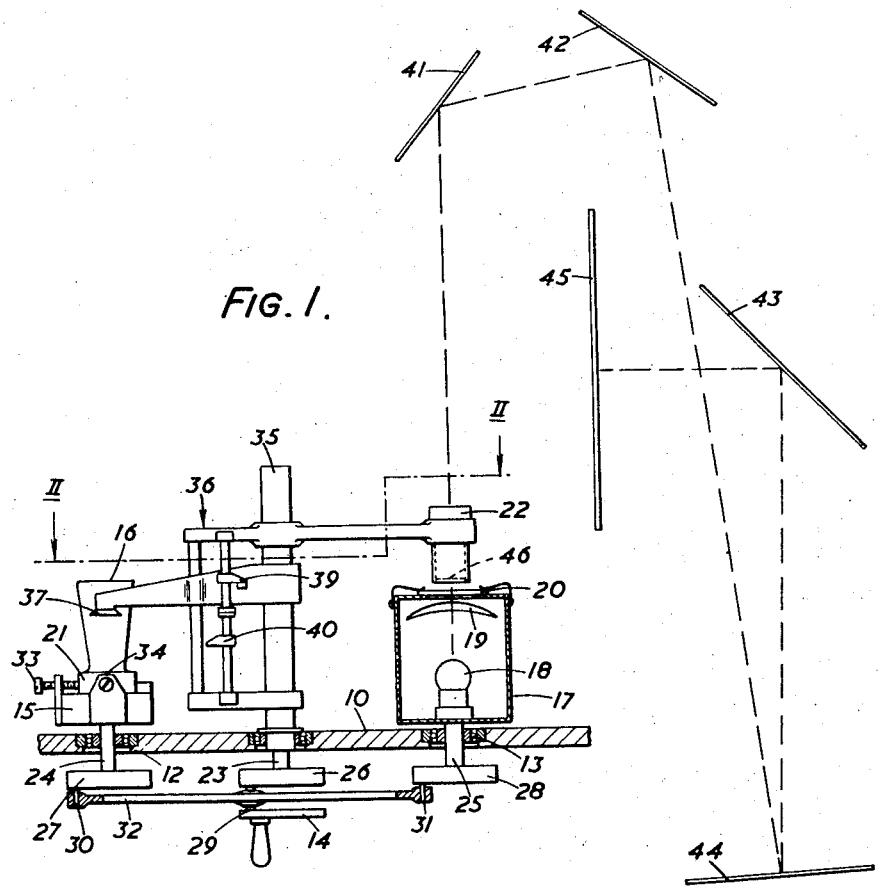
Figure 1 is a schematic diagram of the general arrangement of one form of the apparatus.
Figure 2:
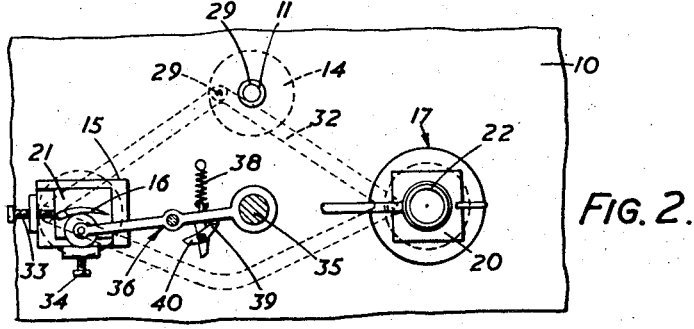
Figure 2 is a plan view of part of the apparatus shown in Figure 1.

In the form of the apparatus shown in Figures 1 to 3 there is a baseplate 10 in which there are set three ball bearings 11, 12 and 13 providing three spaced vertical rotational axes. In one of these bearings 11 is mounted a handwheel assembly 14, in another, 12, is mounted a rotational support 15 for the blade 16 to be gauged, and in the third, 13, is mounted a rotatable light source assembly 17 comprising a bulb 18, a condenser lens system 19 and a laterally adjustable holder for a master contour graticule 20. This graticule is a glass slide on which are delineated pictures of the contour profile of a master blade in different transverse planes. One of these profiles, for instance of the blade platform of a master blade, corresponding to the blade platform 21 of the blade 16 to be gauged, constitutes a datum profile. The graticule 20 is so disposed that it lies approximately in the focal plane of a projector lens system 22 described in more detail below. The light source assembly 17 conveniently includes a cooling fan and a slip-ring device (not shown) for supplying electricity to the filament of the bulb in any rotational position of the assembly. The assembly also includes an adjustment (not shown) for centering the bulb 18.

Stub shafts 23, 24 and 25 mounted in the bearings 11, 12 and 13 project below the baseplate 10 and each carry a flange 26, 27 and 28 respectively. Each of these flanges carries a pin 29, 30 and 31 parallel with and spaced from the rotational axis of the stub shafts 23, 24 and 25, the spacing distances all being equal, and these pins enter bearings in a link member 32 common to all three, so that all three stub-shafts are caused to rotate equally when the handwheel 14 is turned. Thus, turning the handwheel 14 through a given angle produces identical angular rotations of the blade support 15 and of the light source assembly 17 carrying the contour graticule 20.

The blade support 15 is provided with clamping means for engaging the root of the blade 16 and with adjustable stops 33 and 34 which accurately determine the position of the blade in relation to the axis of rotation of the support 15.

Mounted on the base plate 10 at a point equidistant between the axes of rotation of the blade support 15 and the light source assembly 17 is a vertical shaft 35 which acts as a pivotal support for a structure 36 which carries both the projector lens system 22 and a follower 37 which follow the actual contour of the blade 16. The projector lens system 22 and the follower 37 are mounted on radial arms on the said structure 36 and are disposed at equal distances from the shaft 35. The structure is biassed by means of spring 38 so that the follower 37 presses lightly against the blade 16 being gauged. The follower 37 is mounted so that it is vertically movable in the said structure 36 and can be maintained in any of several predetermined vertical positions by means of adjustable stops such as 39, 40, these positions corresponding to the various transverse profiles that are to be gauged.

The projector lens system 22 is disposed in the beam from the light source assembly 17 and is moved transversely across this beam as it follows the movements of the follower 37 over the contour being gauged. Fixed above the projector lens system is an inclined mirror 41 which deflects the emergent beam from the projector lens system 22 on to a mirror system 42—44 which in turn directs it on to a vertical translucent screen 45 facing the operator. This mirror system not only turns the beam into the desired direction facing the operator but also provides, in a small space, the length of the light path necessary for producing the required magnification at the screen.

Attached to the projector lens system 22 and disposed just clear of the said contour graticule 20 so that it is also approximately in the focal plane of the projector lens system is a second graticule 46. This bears a representation of the follower 37, or at least of the part of it which actually comes into contact with the blade 16 being gauged. For instance, where the follower is a wheel the representation may be a circular arc of the same radius as the wheel. The representation may also include oversize and undersize tolerance lines spaced respectively outwardly and inwardly from the said circular arc by distances equal to these tolerances.

Images of both the graticules are thrown upon the screen as shown in Figure 3, the profile 47 being the image of the graticule 20 and the arc 48 the image of the follower graticule 46. The optical system is such that translational movements of the projector lens system 22 appear on the screen as translational movements of the image 47 of the contour graticule and not of the image 48 of the follower graticule 46, because the latter is stationary in relation to the projector lens system 22 whereas there is relative movement between the projector lens system 22 and the contour graticule 20. The rotational component of the movement of the projector lens system 22, however, will be noticeable on the screen as a corresponding rotation of the image 48 of the follower graticule 46.

To set up the instrument, having prepared the master contour graticule 20 from the master blade, this graticule and the master blade are mounted respectively on the light source assembly 17 and on the blade support 15, and the relative positions are adjusted until the images on the screen of the appropriate profile of the master contour graticule and of the follower when the follower is engaging the same profile of the master blade touch in all rotational positions. The position of the bulb 18 in the light source assembly 17 is also adjusted, if necessary, to centre the filament exactly on the axis of rotation of the light source assembly 17. When the adjustments have been correctly made and locked, the instrument can be used for gauging other blades.

Each such blade 16 is inserted in the support 15 against the locating stops 33 and 34 and is clamped in place. Then by turning the handwheel 14 the follower 37 traces round the whole of the contour of the blade 16 in the particular transverse plane for which the follower is set. On the screen the arc 48 representing the follower remains practically stationary, but the image 47 of the contour graticule moves, with translational movements corresponding to the translational movements of the follower 37 magnified by the magnification of the optical system, and with rotational movements corresponding to the rotations of the blade 16 and of the contour graticule 20. If the blade contour is within the permitted tolerance at the plane of gauging, the line representing this plane on the contour graticule image 47 will always lie between the tolerance lines 49 and 50 of the follower image 48 where these images meet, during the complete cycle of movement of the former image 47. Moreover, the area of the screen swept out by the meeting points of the images will be relatively small, and in certain cases will be practically stationary.

In the form of the apparatus shown in Figure 4 many parts are the same as, or closely similar to, the corresponding parts of the apparatus shown in Figures 1 to 3, and these parts have been given the same reference numerals as in Figures 1 to 3. In the form of the apparatus shown in Figure 4 there is a stationary collimator lens 56 interposed between the projector lens system 22 and the first mirror 41. This lens eliminates the optional effect of the rotational component of motion of the projector lens system so that the image of the follower 37 remains absolutely motionless on the screen. This enables the graticule 46 of Figures 1–3 to be dispensed with, since the image of the follower, with its tolerance lines, can be drawn on the screen 45 or on a transparent sheet placed against the screen.

Mounted between the master contour graticule 20 and the projector lens system 22 is a "lean correcting" lens. This comprises an optically flat lens 51 mounted on a gimbal mounting 52 so that it can be tilted in any desired direction, the angle of tilt in two directions at right angles being measurable. When the light beam is normal to this lens, the lens has no deflecting effect on the beam. On the other hand, if the lens is tilted it displaces the beam laterally in the direction of tilt without deflecting it angularly. Thus, in the case of a turbine blade for example, the extent to which the "lean correcting" lens has to be tilted in any direction at any particular transverse cross-section of the blade in order to bring the image of the contour graticule into contact with the image representing the follower provides a measure of the extent to which this cross-section of the blade is laterally displaced from its correct position, even though its actual contour profiles may be correct. By making such measurements at different transverse planes the "lean error," that is to say, the angle by which the longitudinal axis of the blade is offset laterally from the true perpendicular can readily be ascertained.

The position of the "lean correcting" lens is adjusted by means of manual controls 53 and 54 provided with scales which indicate the extent to which the "lean correcting" lens has been tilted in each of two directions at right angles.

The blade support 15 is mounted so as to be angularly adjustable on a platform 55 attached to the stub shaft. Thus the angular position of the blade 16 in relation to the master graticule 20 can be adjusted to enable "twist error" in the blade 16 to be ascertained. "Twist error" is a condition in which the blade has an incorrect twist about its longitudinal axis even though its actual contour profiles may be correct.

What we claim as our invention and desire to secure by Letters Patent is:

1. Optical contour gauging apparatus comprising a base, article supporting means rotatably mounted on said base, an article having a contour in a plane to be gauged mounted on said article supporting means, follower supporting means on said base, a follower movably mounted on said follower supporting means for movement in said plane in contact with said contour, projector lens supporting means movably mounted on said base, a projector lens system mounted on said projector lens supporting means, an operative connection between said follower and said projector lens supporting means for causing said projector lens to duplicate the movements of said follower in a plane parallel to said first mentioned plane, means producing a light beam through said projector lens system perpendicular to the said plane of movement of said projector lens system, a screen mounted in said light beam with said projector lens system between said light beam producing means and said screen, contour graticule supporting means rotatably mounted on said base, a contour graticule supported on said contour graticule supporting means between said means for producing a light beam and said projector lens system, and means connecting said contour graticule supporting means and said article supporting means for simultaneous and equal rotation.

2. Optical contour gauging apparatus according to claim 1 in which said follower supporting means and said projector lens supporting means includes a common structure mounted on said base for angular movement about a pivotal axis parallel with the optical axis of said projector lens system and perpendicular to the plane of said contour, and said follower and said projector lens system are carried by said structure equidistantly from said pivotal axis.

3. Optical contour gauging apparatus according to claim 1 in which said means for producing a light beam comprises a light source and a condenser lens system, and said light source and said condenser lens system form part of said contour graticule supporting means.

4. Optical contour gauging apparatus according to claim 1 in which said structure is adapted to support said follower in each of a plurality of transverse planes of said article.

5. Optical contour gauging apparatus according to claim 1 in which there is a collimating lens disposed between said projector lens system and said screen.

6. Optical contour gauging apparatus according to claim 1 including a correcting lens having parallel faces disposed between said contour graticule and said projector lens system, said correcting lens being pivotally mounted on a carrier for pivotal movement about a first axis perpendicular to the light beam, and also for pivotal movement about a second axis perpendicular both to the light beam and to said first axis.

7. Optical contour gauging apparatus according to claim 1 including means for adjusting the angular position of said article supporting means in relation to said contour graticule.

References Cited in the file of this patent

UNITED STATES PATENTS

| | | |
|---|---|---|
| 2,552,238 | Turner et al. | May 8, 1951 |
| 2,737,080 | Mottu | Mar. 6, 1956 |
| 2,799,206 | Fuller | July 16, 1957 |
| 2,804,800 | Stevens | Sept. 3, 1957 |